Nov. 15, 1927.  
G. G. GILPIN  
1,649,466  
CAR COUPLER POSITIONING DEVICE  
Filed April 19, 1926 — 2 Sheets-Sheet 1
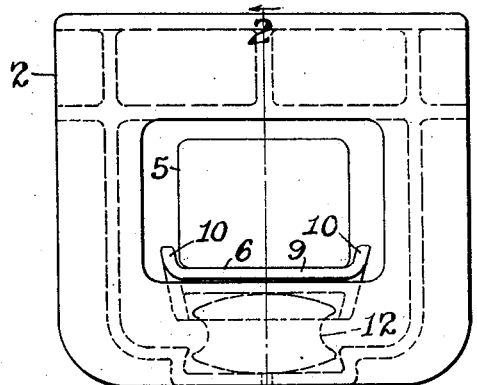
Fig. 1
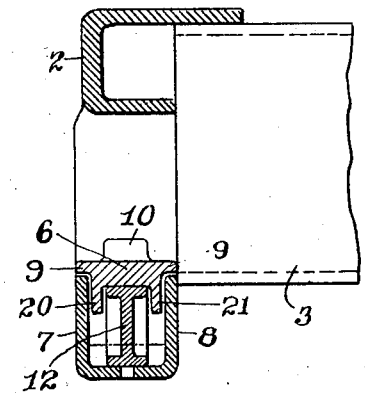
Fig. 2
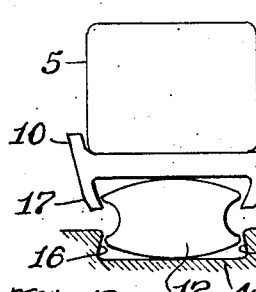
Fig. 3
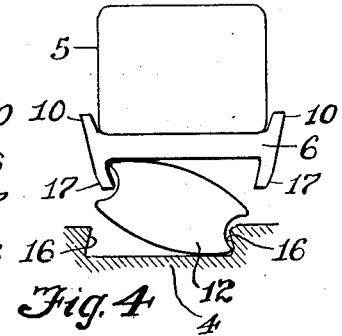
Fig. 4
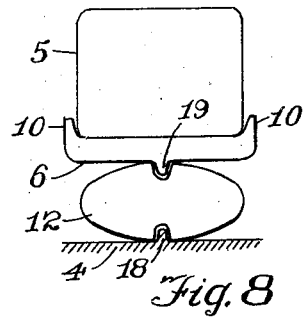
Fig. 8
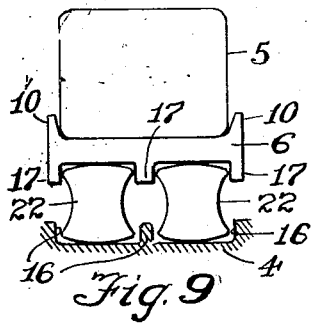
Fig. 9
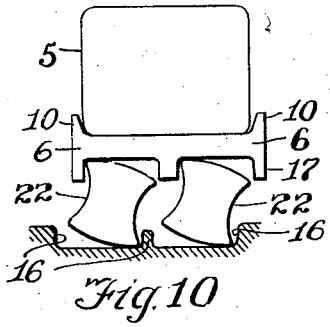
Fig. 10
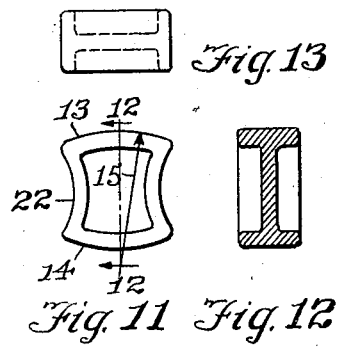
Fig. 11  Fig. 12
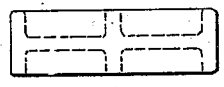
Fig. 13
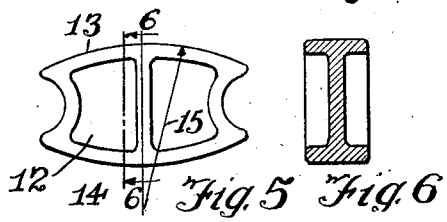
Fig. 7  
Fig. 5  Fig. 6
Inventor:  
Garth G. Gilpin  
Linton E. Sisson  
Attorney Nov. 15, 1927.  
G. G. GILPIN  
1,649,466  
CAR COUPLER POSITIONING DEVICE  
Filed April 19, 1926  2 Sheets-Sheet 2

Inventor:  
Garth G. Gilpin  
Clinton E. Sisson  
Attorney

Patented Nov. 15, 1927.

1,649,466

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

CAR-COUPLER-POSITIONING DEVICE.

Application filed April 19, 1926. Serial No. 103,051.

This device relates to means for automatically positioning the coupler of a railway car by gravity.

Two railway cars are automatically coupled together by the movement of their respective couplers forcing the tails of the pivoted knuckles behind gravity locks. The couplers are mounted in the cars so as to permit a limited amount of lateral movement. Such limitation is necessary and essential because if the couplers were allowed to move too far to either side, the couplers of the two cars being coupled would pass each other and not couple, thereby defeating the object of the automatic coupler. The greater the lateral movement of a coupler the less side pressure on the striking casting when the cars are going around curves. This lateral pressure forces the wheel flanges against the rail causing considerable friction and wearing of the rails and wheels.

One of the objects of the invention is to increase the amount of permissible lateral movement of a coupler by providing automatic means for returning the couplers to the longitudinal center of the car or at least close enough thereto so that the automatic couplers will couple. This is what is termed the "coupling range".

It is very often necessary to couple cars on curves and frequently when the radius of the curve is very small, as is common around industrial plants, the couplers of the two cars will be so far out of alignment that they will not automatically couple. Another object of the invention is to automatically bring such couplers within coupling range. The outside rail of a curved track is raised above the inside rail and I provide means whereby the coupler is moved toward the inside of the curve by gravity. This automatic gravity means also returns the coupler to the longitudinal center of the car when the car moves from the curved to the straight part of the track.

In my device the lateral movement between the coupler and the carrier is eliminated, thus reducing friction and consequent wear on the parts. This is quite an item particularly in sandy countries because couplers are costly and the replacement of a coupler means keeping the car out of service.

Coupler positioning devices reduces the number of broken knuckles and guard arms on couplers which members are frequently bent or broken when the couplers are not within coupling range. Such devices also reduce the number of accidents to trainmen as they are not required to go between the cars and position the coupler preparatory to coupling.

It has been found advantageous to have the coupler support cast integral with the striking casting to obtain a four sided member which reinforces the end sill, draft sill and associated parts and my device is especially adaptable to such a combined casting.

In the drawings:

Fig. 1 shows a typical application of the device to a railway car.

Fig. 2 is a section on line 2—2 of Fig. 1 with the coupler omitted.

Figs. 3 and 4 are diagrams showing the preferred form in normal position and extreme lateral position, respectively.

Figs. 5, 6 and 7 show the roller of Figs. 3 and 4 in detail, Fig. 6 being a section on line 6—6 of Fig. 5.

Fig. 8 shows a modified form having a different means of retaining the parts in proper relative position.

Figs. 9 and 10 are diagrams showing the device made of two (or more) rollers.

Figs. 11, 12 and 13 show one of the rollers of Figs. 9 and 10 in detail, Fig. 12 being a section on line 12—12 of Fig. 11.

Figure 14:
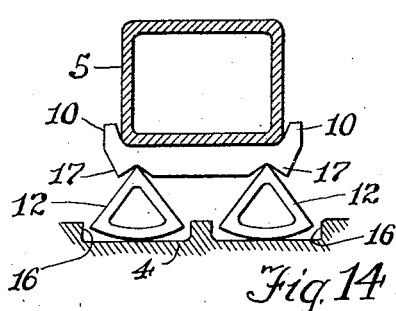

Fig. 14 shows a modified form of the roller.

Figure 15:
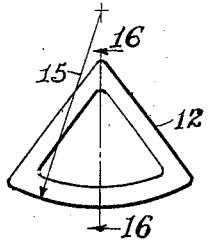

Fig. 15 shows the roller of Fig. 14 in detail.

Figure 16:
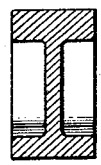

Fig. 16 is a section on line 16—16 of Fig. 15.

Figure 17:
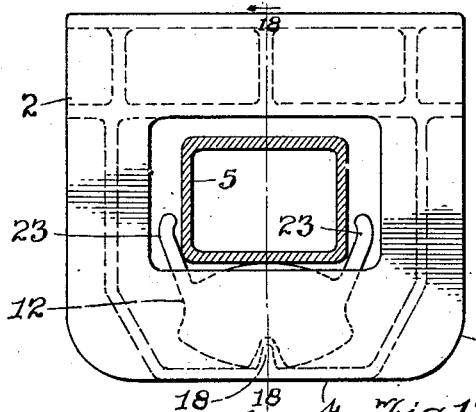

Fig. 17 shows a modification wherein the carriage has been eliminated.

Figure 18:
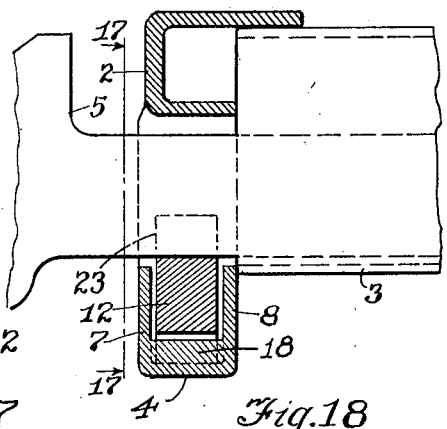

Fig. 18 is a section on line 18—18 of Fig. 17.

Figure 19:
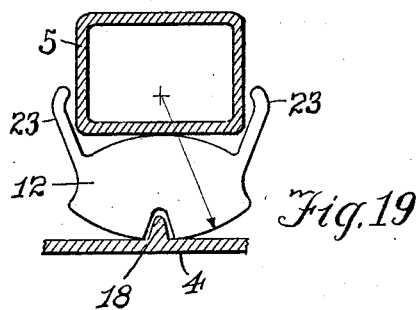
Figure 20:
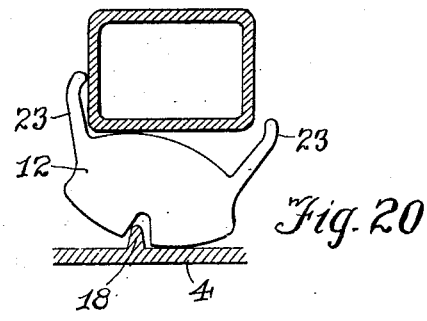

Figs. 19 and 20 are diagrams showing the construction of Figs. 17 and 18 in normal position and extreme lateral position, respectively.

Figure 21:
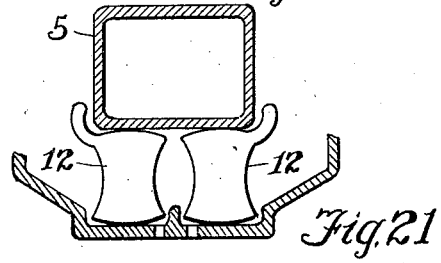

Fig. 21 shows a double roller arrangement with the carriage eliminated.

The striking casting or buffer block 2 is attached to the draft sill 3 or other part of a car in any suitable manner and the coupler support 4 is attached to it or preferably cast integral therewith. The coupler 5 rests upon a carriage 6 which engages the support in such a manner as to restrict its movement longitudinally of the car but to permit its movement sidewise of the car. This is preferably accomplished by providing a U-shaped support having spaced apart walls 7—8 between which the carriage moves in one direction but is restricted in its movement longitudinally of the car. This carriage 6 has lateral extending flanges 9 which are positioned above the support so that if the positioning device fails the carriage will rest upon the support. The carriage is also provided with means 10 to restrict the lateral movement of the coupler relative thereto.

One or more rollers 12 are interposed between the support and the carriage, each of which rollers has curved upper surface 13 and lower surface 14 which engage the carriage and support, respectively. These rollers are held in place by being positioned within a U-shaped support 4. The radius 15 of each of the curved surfaces is greater than half the depth of the roller so that as it rolls to one side it raises the coupler, as shown in Figs. 4 and 20. This is what is called an eccentric roller.

Some means must be provided co-acting with the curved surface to maintain operative relation between the various elements. This may be accomplished by providing projections 16—17 on the support and carriage, respectively, which engage the opposite ends of the rollers, as shown in Figs. 3 and 4. This result may also be accomplished by providing a single projection 18—19 on the support and carriage, respectively, which engage slots on the opposite sides of the roller, as shown in Fig. 8. This projection is preferably a rib connecting the opposite walls 7—8 of the support or the opposite walls 20—21 of the carriage.

Figs. 9 and 10 show a pair of rollers 22 interposed between the carriage and the support. These rollers may be held in operative relation by oppositely positioned lugs or by a single rib arrangement, similar to that shown in Fig. 8.

Figs. 5, 6 and 7 show the single roller (12) in detail, while Figs. 11, 12 and 13 show one of the double rollers (22) in detail.

Fig. 14 shows a construction wherein the curved surface is used on one side of the roller only.

Figs. 15 and 16 show one of the rollers, as illustrated in Fig. 14.

Figs. 17 and 18 show a single roller arrangement wherein the carriage is eliminated by providing projecting horns 23 on either side of the roller. Two small rollers with horns could be used instead of one larger roller, if desired, as shown in Fig. 21.

I claim:

1. In a railway car; the combination of a coupler support, a laterally movable coupler, and a roller interposed therebetween with curved surfaces having a rolling engagement with said support and said coupler, respectively, the radius of each surface being greater than half the depth of the roller.

2. In a railway car; the combination of a coupler support, a laterally movable coupler, and a roller interposed therebetween with curved surfaces having a rolling engagement with said support and said coupler, respectively, the radius of each surface being greater than half the depth of the roller, said support and said roller, respectively, being provided with means co-acting with said surface to maintain operative relation between the elements.

3. In a railway car; the combination of a coupler support, a laterally movable coupler, and a roller interposed therebetween with curved surfaces having a rolling engagement with said support and said coupler, respectively, the radius of each surface being greater than half the depth of the roller, said support and said roller, respectively, being provided with projections which engage the opposite ends of the roller to maintain operative relation between the elements.

4. In a railway car; the combination of a coupler support, a laterally movable coupler, and a roller interposed therebetween with curved surfaces having a rolling engagement with said support and said coupler, respectively, the radius of each surface being greater than half the depth of the roller, said support and said roller, respectively, being provided with projections which engage the roller to maintain operative relation between the elements.

5. In a railway car; the combination of a coupler support, a coupler carriage, said carriage having means to restrict the lateral movement of a coupler relative thereto, and a roller interposed therebetween with curved surfaces having a rolling engagement with said support and said carriage, respectively, the radius of each surface being greater than half the depth of the roller.

6. In a railway car; the combination of a coupler support, a coupler carriage, said carriage having means to restrict the lateral movement of a coupler relative thereto, and a roller interposed therebetween with curved surfaces having a rolling engagement with said support and said carriage, respectively, the radius of each surface being greater than half the depth of the roller, said support and said carriage, respectively, being provided with means co-acting with said surface to maintain operative relation between the elements.

7. In a railway car; the combination of a coupler support, a coupler carriage, said carriage having means to restrict the lateral movement of a coupler relative thereto, and a roller interposed therebetween with curved surfaces having a rolling engagement with said support and said carriage, respectively, the radius of each surface being greater than half the depth of the roller, said support and said carriage, respectively, being provided with projections which engage the opposite ends of the roller to maintain operative relation between the elements.

8. In a railway car; the combination of a coupler support, a coupler carriage, said carriage having means to restrict the lateral movement of a coupler relative thereto, and a roller interposed therebetween with curved surfaces having a rolling engagement with said support and said carriage, respectively, the radius of each surface being greater than half the depth of the roller, said support and said carriage, respectively, being provided with projections which engage the roller to maintain operative relation between the elements.

9. In a railway car; the combination of a coupler support, a coupler carriage engaging said support so as to permit its movement sidewise of the car but to restrict its movement longitudinally of the car, said carriage having means to restrict the lateral movement of a coupler relative thereto, and a roller interposed therebetween with curved surfaces having a rolling engagement with said support and said carriage, respectively, the radius of each surface being greater than half the depth of the roller, said support and said carriage, respectively, being provided with means co-acting with said surface to maintain operative relation between the elements.

GARTH G. GILPIN.